United States Patent

Maiwald et al.

[11] Patent Number: 5,597,172
[45] Date of Patent: Jan. 28, 1997

[54] SPRAYER SUSPENSION AND STEERING

[75] Inventors: Marvin A. Maiwald, Ankeny, Iowa; Bernard E. Romig, Illinois City, Ill.

[73] Assignee: Deere & Company, Moline, Ill.

[21] Appl. No.: 545,189

[22] Filed: Oct. 17, 1995

[51] Int. Cl.$^6$ .................................................. B60P 1/16
[52] U.S. Cl. .................... 280/672; 280/693; 280/711
[58] Field of Search ............................. 280/693, 672, 280/711, 698, 713

[56] References Cited

U.S. PATENT DOCUMENTS

| | | | |
|---|---|---|---|
| 2,171,185 | 8/1939 | Maier | 267/217 |
| 2,220,254 | 11/1940 | Maier | 280/670 |
| 2,257,422 | 9/1941 | Maier | 280/670 |
| 2,567,144 | 9/1951 | Butterfield | 280/670 |
| 2,865,651 | 12/1958 | Chayne et al. | 280/712 |
| 2,902,290 | 9/1959 | Hausmann | 280/670 |
| 3,042,392 | 7/1962 | Schmitz et al. | 267/31 |
| 3,042,422 | 7/1962 | Garnett | 280/672 |
| 3,148,871 | 9/1964 | Wilkins et al. | 267/64.17 |
| 3,565,455 | 2/1971 | Kostas | 280/672 |
| 3,604,725 | 9/1971 | Goff et al. | 280/672 |
| 4,071,277 | 1/1978 | Stedman | 280/672 |
| 4,342,372 | 8/1982 | Hayes | 180/182 |
| 4,422,657 | 12/1983 | Swanson | 280/21.1 |
| 4,453,734 | 6/1984 | McGhie et al. | 280/662 |
| 4,783,095 | 11/1988 | Rampini et al. | 280/672 |
| 4,961,594 | 10/1990 | Pees | 280/693 |
| 5,039,129 | 8/1991 | Balmer | 280/840 |

FOREIGN PATENT DOCUMENTS

| | | |
|---|---|---|
| 1211872 | 3/1960 | France . |
| 274222 | 5/1930 | Italy . |
| 319483 | 3/1934 | Italy . |
| 453808 | 9/1936 | United Kingdom . |
| 474506 | 11/1937 | United Kingdom . |
| 771663 | 4/1957 | United Kingdom . |
| 825408 | 12/1959 | United Kingdom . |
| 870450 | 6/1961 | United Kingdom . |

*Primary Examiner*—Kenneth R. Rice

[57] ABSTRACT

An agricultural sprayer suspension includes four generally identical independent strut suspension assemblies each having a pneumatic spring supported above a strut shaft which is received within a strut journal connected to an adjustable axle. A scissors assembly located above the axle maintains wheel steer while facilitating vertical movement of the strut shaft within the journal. On non-steerable wheels, the lower end of the scissors assembly is connected to the journal to maintain a preselected wheel orientation. For steerable wheels, the lower end of the scissors assembly is connected to a hydraulic steering structure which allows axle adjustments for varying wheel tread. Similar construction of the steerable and non-steerable wheel assemblies reduces the number of different parts required and facilitates selective construction of sprayers with either two-wheel or four-wheel steering. A centrally located cab and sloping hood structure provide good visibility and direct viewing of all four wheels.

24 Claims, 7 Drawing Sheets

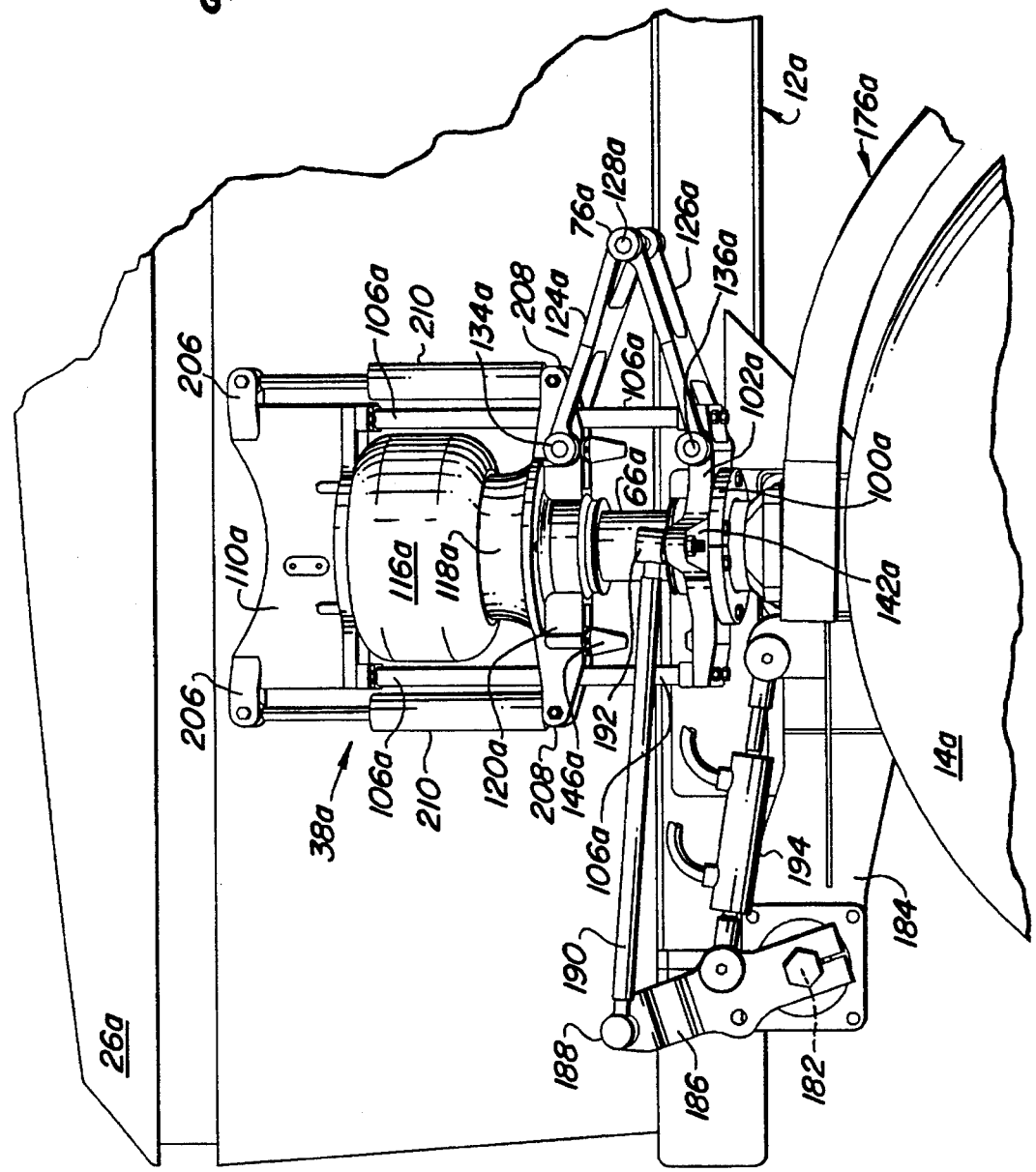

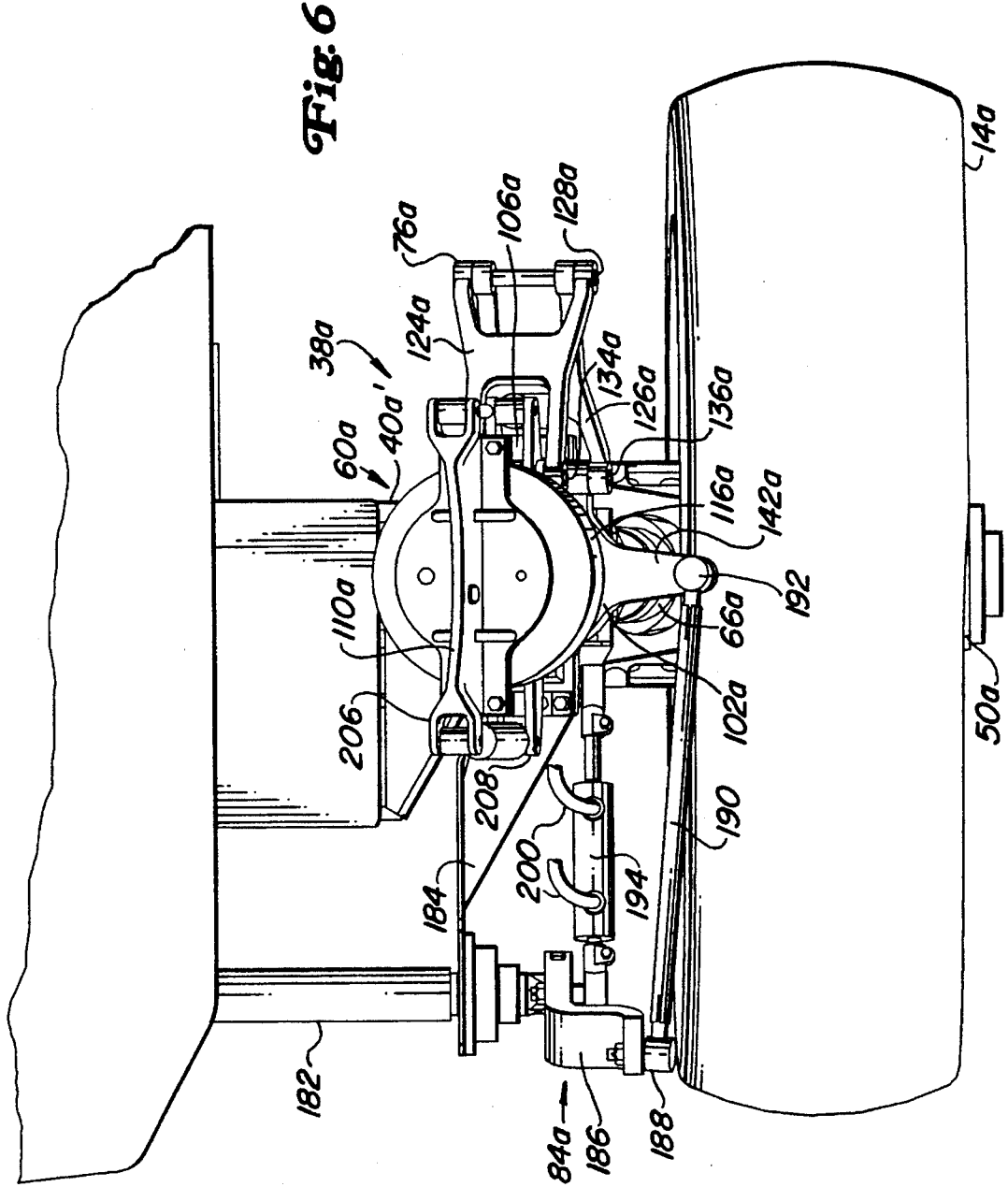

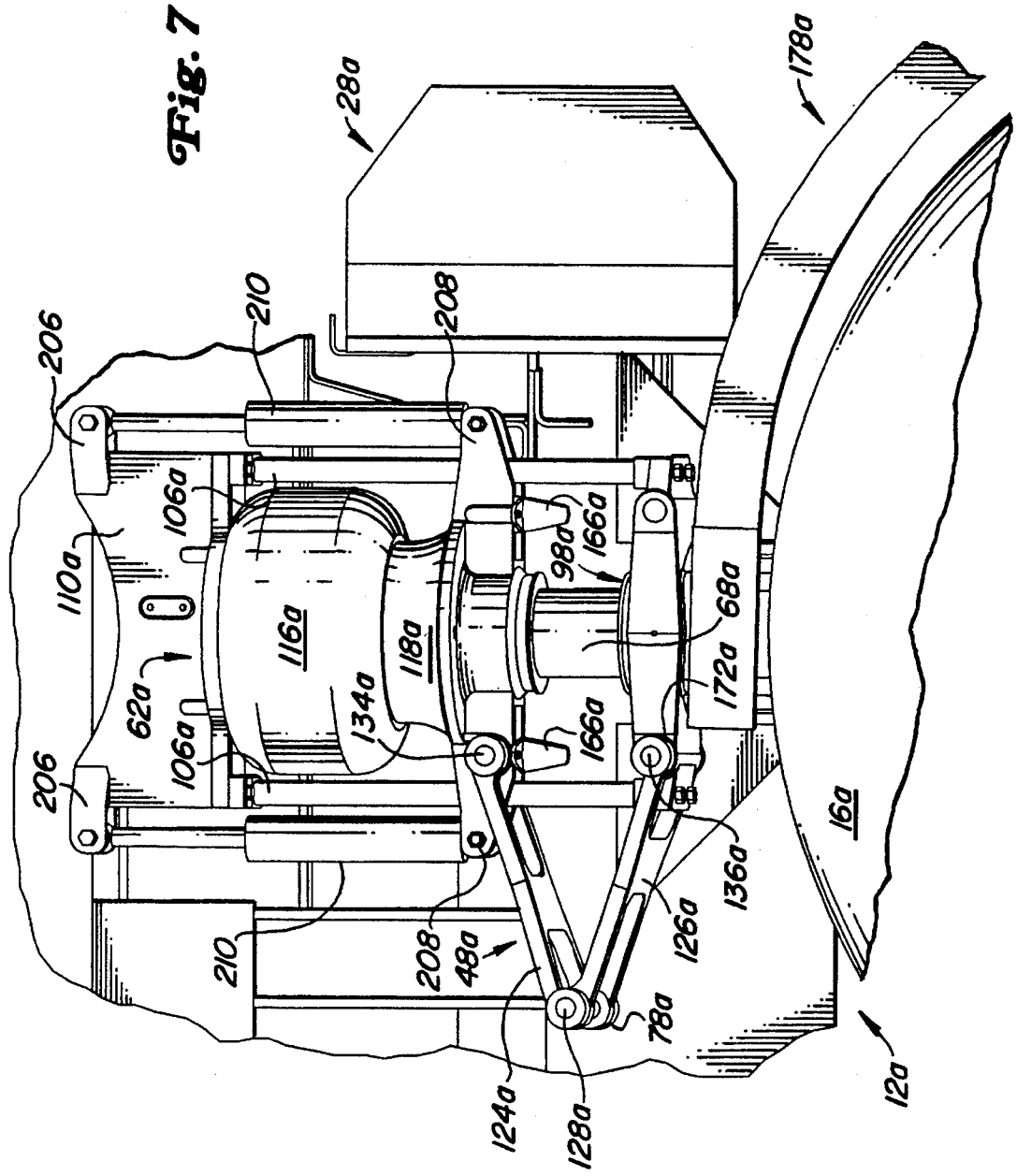

5,597,172

SPRAYER SUSPENSION AND STEERING

BACKGROUND OF THE INVENTION

1) Field of the Invention

The present invention relates generally to agricultural sprayers and, more specifically, to suspension and steering systems for such sprayers.

2) Related Art

Self-propelled crop sprayers such as the John Deere Model 6500 Sprayer are often required to operate over rough ground surfaces and in tall mature crops. Various devices are used to help cushion the vehicle and operator from the effects of rough surfaces, but most suffer from one or more disadvantages such as limited cushioning or bulkiness leading to increased interference with the crop being sprayed. A cushioned wheel arrangement, such as the front wheel suspension shown in U.S. Pat. No. 5,066,030, is available for relatively small sprayers with a single steerable wheel. However, such a suspension is not suitable for most larger sprayers or sprayers having two or more steerable wheels. Some available self-propelled sprayers have strut suspensions on the front axle, but lack a cushioned suspension or have an arm-type of suspension on the rear.

Steering arrangements for sprayer wheel assemblies that are cushioned include those with steering arms at the tops the strut shafts. Such top mounted arm arrangements suffer from the problem of undesired movement of the steerable wheels over rough ground surfaces, referred to as bump steering, as the steering arms move up and down with the strut shafts.

Often, sprayer suspensions include strut shafts with steel suspension springs immersed in oil, but these are subject to leakage, and enclosing the springs requires relatively large diameter supports both above and below the axle. Providing adequate cushioning over a substantial range of vertical wheel movement without adversely affecting crop clearance continues to be a problem.

The row spacings in row crop situations can vary from field to field so that the wheel tread of the spray vehicle has to be adjusted accordingly. An adjustable axle for a sprayer is shown in copending and commonly assigned U.S. application Ser. No. 08/372,751 entitled "Adjustable Axle with Shim Structure" filed 13 Jan. 1995, now U.S. Pat. No. 4,071,277. Machines with transversely adjustable steerable wheels usually must have some kind of adjustable steering linkage to accommodate wheel tread adjustment. Making the necessary linkage adjustments when wheel tread is changed can be time-consuming and inconvenient. Providing good visibility from the cab of the sprayer and maintaining a direct line of sight from the cab to the wheels of the sprayer have often been a problem also.

BRIEF SUMMARY OF THE INVENTION

It is therefore an object of the present invention to provide an improved suspension for an agricultural crop sprayer. It is a further object to provide such an improved suspension which overcomes most or all of the aforementioned problems.

It is a further object of the present invention to provide an improved suspension for a crop sprayer which is compact so crop interference is minimized. It is still another object of the invention to provide such a suspension which provides good cushioning without adversely affecting crop clearance.

It is another object of the present invention to provide an improved suspension for a crop sprayer which is particularly useful with steered wheels. It is still another object to provide an improved suspension wherein cushioning and steering components are advantageously located so that crop interference is minimized. It is another object to provide such a suspension which eliminates bump steering problems.

It is a further object to provide an improved self-propelled agricultural crop sprayer having a smoother ride over rough ground surfaces than at least most previously available sprayers. It is a further object to provide such a sprayer having an improved steering system and improved crop clearance. It is another object to provide such a sprayer having improved visibility.

It is yet another object of the invention to provide a sprayer steering structure which accommodates tread adjustment without requiring steering link adjustment. It is another object to provide steering structure wherein bump steer effects are eliminated.

It is still another object to provide an improved sprayer with four wheel independent strut suspension providing better ride and crop clearance characteristics than at least most previously available sprayers. It is another object to provide such a sprayer which minimizes the number of different parts.

A crop sprayer constructed in accordance with the teachings of the present invention includes four-wheel independent strut suspension with two or more of the wheels being steerable. An upright strut shaft having upper and lower ends and a central portion is slidably received within a strut journal mounting located on the outer end of a transversely adjustable axle. An adjustable pressure air spring is supported above the axle by a mount to bias the strut shaft downwardly and provide cushioning for a ground-engaging wheel connected to the lower end of the shaft as the shaft moves axially in the journal. The air pressure is adjustable so that the suspension is in a nominal or midstroke position for a given load to minimize the contact of jounce and rebound stops at opposite ends of the strut shaft stroke. Variable spring rate provided by the air springs significantly improves sprayer ride and performance. The entire machine can also be lowered by reducing the air spring pressure. The compact suspension structure provides good crop clearance.

Scissors structure having an upper link connected to the upper end of the strut shaft and a lower link pivotally connected to the upper link provide steering for steerable wheels or wheel orientation for non-steerable wheels while permitting free axial movement of the strut shaft. For the steerable wheels, a steering assembly for rotating the strut shaft via the scissors structure is located substantially entirely above the axle for crop clearance. The axial movement of the strut shaft is independent of the rotational movement to prevent unwanted bump steering when the vehicle is moving over rough ground. Tread adjustments are facilitated by steering structure that moves with extension or retraction of an adjustable axle. In the preferred embodiment, series connected steering cylinders extend between the adjustable axle and steering pivots connected to the lower links of the scissors structure. In a second embodiment, a telescoping shaft connects a pair of steerable wheel assemblies operated by parallel connected steering cylinders located at each end of the shaft. On the suspensions for the non-steerable wheels, the lower link of the scissors structure is connected to the pivot journal for maintaining the strut shaft in a preselected angular position wherein the wheels remain in the straight-ahead position as the strut shaft moves vertically within the journal. Two-wheel or four-wheel steer can be accommodated easily. Many of the components for the steerable wheel assemblies are the same as for the non-steerable wheel assemblies to minimize parts, simplify and speed construction, and reduce costs. A centrally located cab and a sloping hood provide good visibility and direct viewing from the cab of all four wheels.

These and other objects, features and advantages of the present invention will become apparent to one skilled in the art upon reading the following detailed description in view of the drawings.

BRIEF DESCRIPTION OF THE DRAWINGS

FIG. 5 is a side view of a front portion of a sprayer showing an alternate embodiment of a steerable strut assembly.

FIG. 6 is a top view of the portion of the sprayer shown in FIG. 5.

FIG. 7 is a side view of the rear portion of the sprayer shown in FIG. 5 and showing an alternate embodiment of a nonsteerable strut assembly.

DETAILED DESCRIPTION OF THE DRAWINGS

Figure 1:
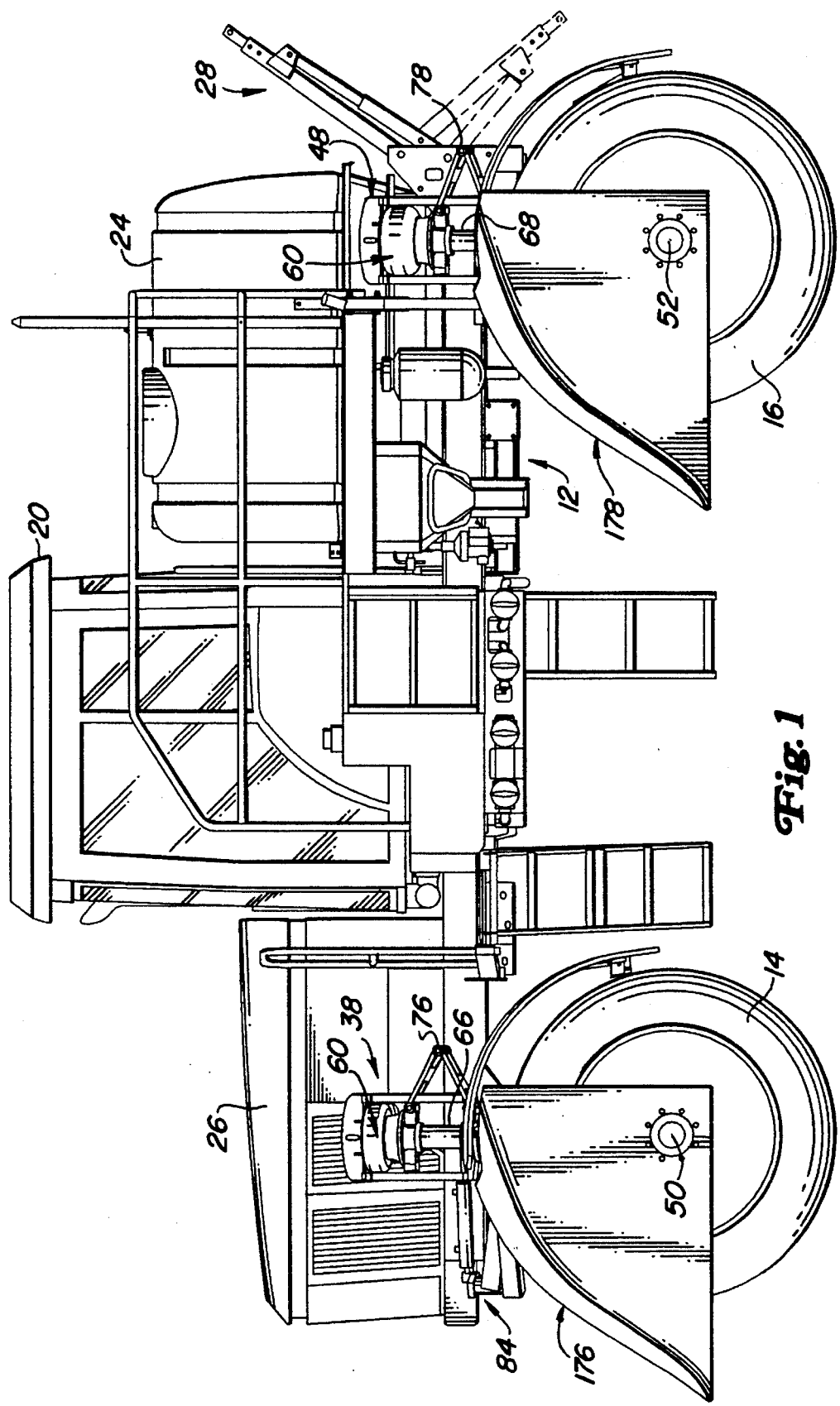
FIG. 1 is a side view of a sprayer constructed in accordance with the teachings of the present invention.

Description of the Preferred Embodiment:

Referring now to FIG. 1, therein is shown a high clearance, self-propelled agricultural sprayer 10 having a fore-and-aft extending main frame 12 supported for forward movement over the ground by forward wheels 14 and rear wheels 16 which are transversely adjustable to provide variable tread settings. A cab 20 is supported on the frame between the forward and rear wheels 14 and 16 directly ahead of a chemical solution tank 24 and behind a hood 26 which angles downwardly in the forward direction over the engine compartment to a location generally aligned with the forward extremities of the forward wheels 14. A rear boom support 28 is connected to the aft end of the frame 12.

Figure 2:
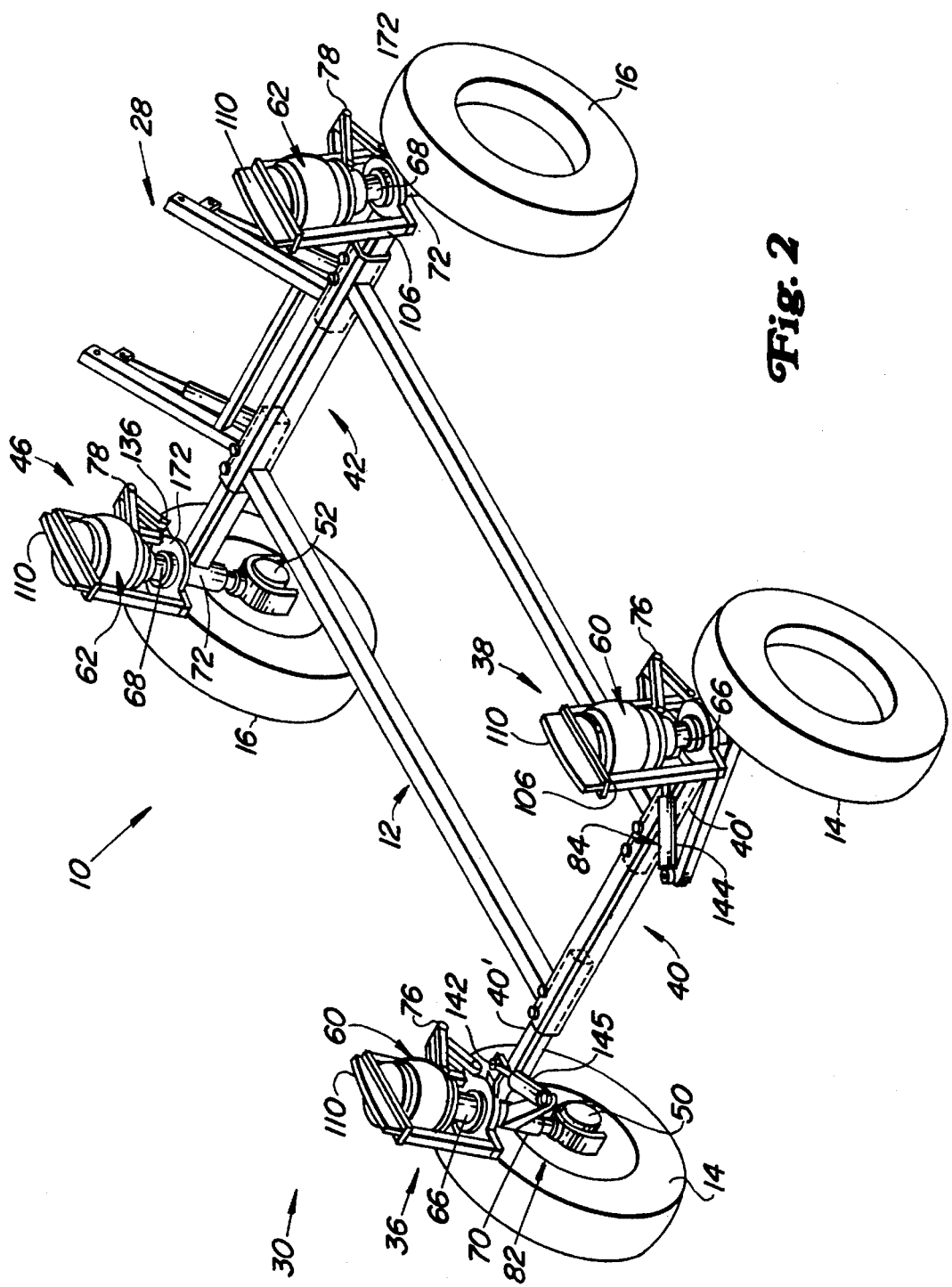
FIG. 2 is schematic view of the lower frame and the strut and steering structure for the sprayer of FIG. 1.

A steering and suspension system indicated generally at 30 in FIG. 2 includes four wheel independent strut suspension having at least two steerable ground wheel assemblies 36 and 38 mounting the wheels 14 and supported from a first transversely adjustable telescoping axle structure 40 at the forward end of the frame 12. At the rear of the frame 12, a second transversely adjustable telescoping axle structure 42 supports non-steerable wheel assemblies 46 and 48 mounting the wheels 16 outwardly of the boom support 28. Hydraulic drive motors 50 and 52 are connected to the wheels 14 and 16, respectively, and to a conventional controlled source of hydraulic fluid under pressure (not shown) on the sprayer 10 to provide vehicle drive.

The suspension system includes substantially similar adjustable cushioning structures 60 and 62 supported above strut shafts 66 and 68, respectively. The strut shafts 66, supported within strut journals 70 on the opposite ends of the forward adjustable axle structure 40, are rotatable and axially moveable within the journals. The strut shafts 68 are supported for axial movement within axle journals 72 located at on opposite ends of the rear adjustable axle structure 42. Scissors-type strut shaft rotational control structures 76 and 78 are connected between the upper ends of the respective journals 70 and 72 to orient the wheels 14 and 16 while permitting axial movement of the strut shafts within the strut journals. The scissors structures 76 for the steerable wheels 14 have lowermost ends connected to hydraulically controlled steering assemblies 82 and 84 supported on the end of the adjustable axle assembly. The steering assemblies 82 and 84 are movable with the ends of the axle structure 40 as wheel tread is adjusted to thereby retain steering function and eliminate need for disassembly or separate adjustment of the steering assemblies. The cushioning structures 60 and 62, scissors structures 76 and 78, and steering assemblies 82 and 84 are located substantially entirely above the axle structures 40 and 42 so that the space between the axle structures and the ground is substantially unencumbered for good crop clearance.

Referring now to FIGS. 1–4, the preferred embodiment of the steerable ground wheel assembly 38 (the left front assembly) will be described in detail. The right front assembly 36 is constructed generally the same as the assembly 38 and so will not be described in full detail. The strut journal 70 is integral with an outer end 40' of the telescoping portion of the axle structure 40 and includes an upright cylindrical bore 90 which angles outwardly in the downward direction. The strut shaft 66 is slidably and rotatably received within the bore 90 and extends downwardly below the bottom of the strut journal 70 to a connection at 94 (FIG. 3) with the hub and drive assembly for the wheel 14. A dust cover and/or seal structure indicated generally at 96 helps prevent dirt from entering the lower end of the journal area. The upper end of the strut shaft 66 projects above the journal 70 and above the axle structure 40, and a dust cover and/or seal structure 98 protects against entry of contaminants at the upper end of the journal 70.

A flange 100 is connected to the upper end of the strut journal 70 and rotatably mounts a lower pivot bracket 102 for rotation about an upright axis corresponding to the axis of the strut journal 70. On radially opposed ends of the bracket 102, a pair of straps 106 extend upwardly parallel to each other and to the shaft axis to a connection with a fore-and-aft extending plate or upper mount 110. The cushioning structure 60 includes an inflatable air spring 116 having a top portion abutting the lower edge of the upper mount 110 and a lower portion positioned against a bell-shaped piston 118. The bottom of the piston 118 is connected to the uppermost end of the strut shaft 66 by connecting structure 120 so that the spring 116 provides a downward bias on the shaft 66 which increases as the piston 118 is forced upwardly by movement of the strut shaft 66 within the journal 70.

The scissors structure 76 includes upper and lower arms 124 and 126 having outermost ends connected by a pivot 128. The arms 124 and 126 extend inwardly at an acute angle with respect to each other to vertically offset pivotal connections at 134 and 136 with the connecting structure 120 and the lower pivot bracket 102, thereby constraining the structure 120 and strut shaft 66 to maintain a constant angular relationship with the lower pivot bracket 102 while permitting the strut shaft 66 to move up and down in the journal 70 to compress and relax the air spring 116 as the wheel 14 moves over the surface of the ground or as the weight supported by the wheel changes.

Figure 3:
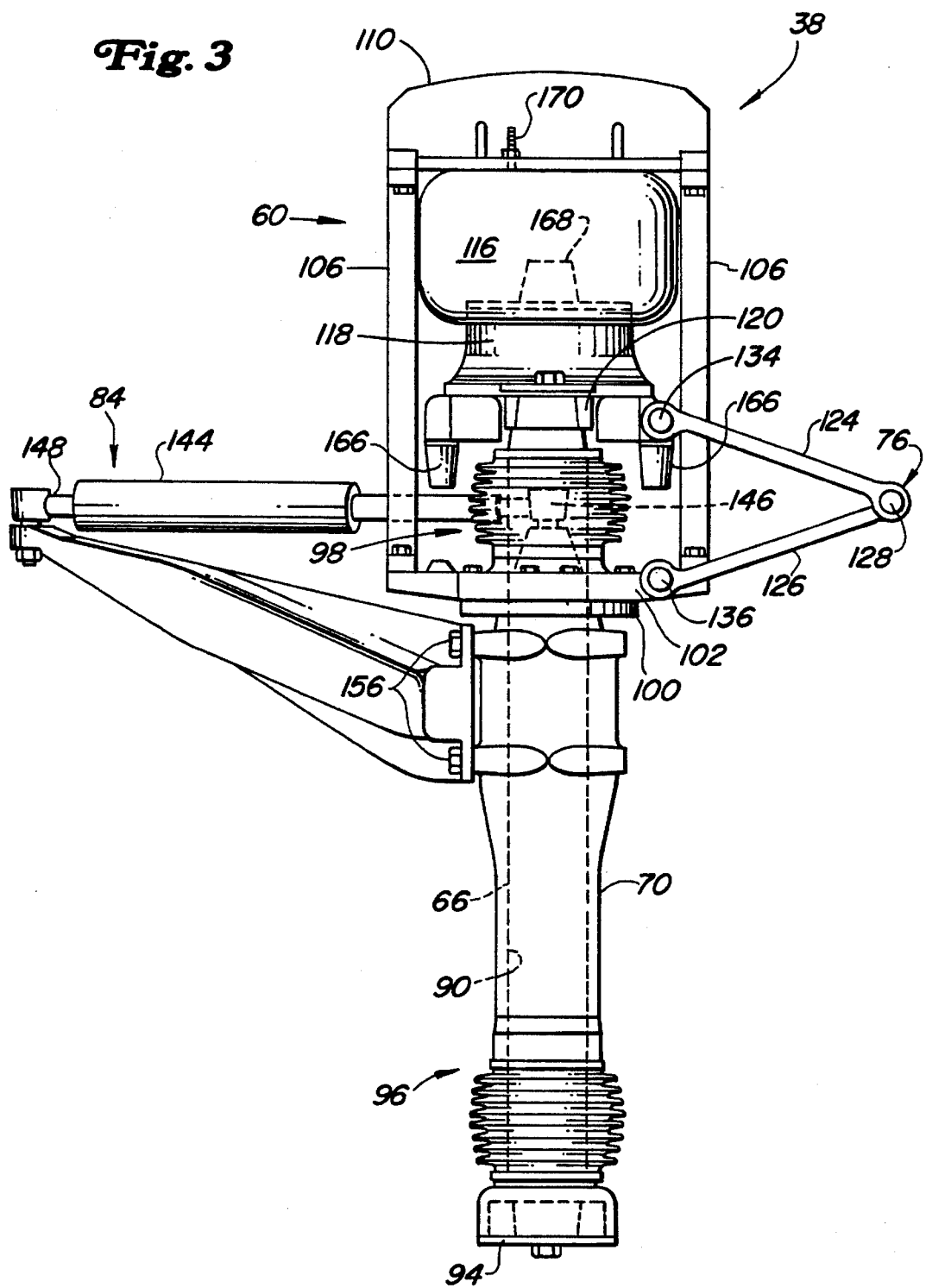
FIG. 3 is side view of a steerable strut assembly for the sprayer of FIG. 1.
Figure 4:
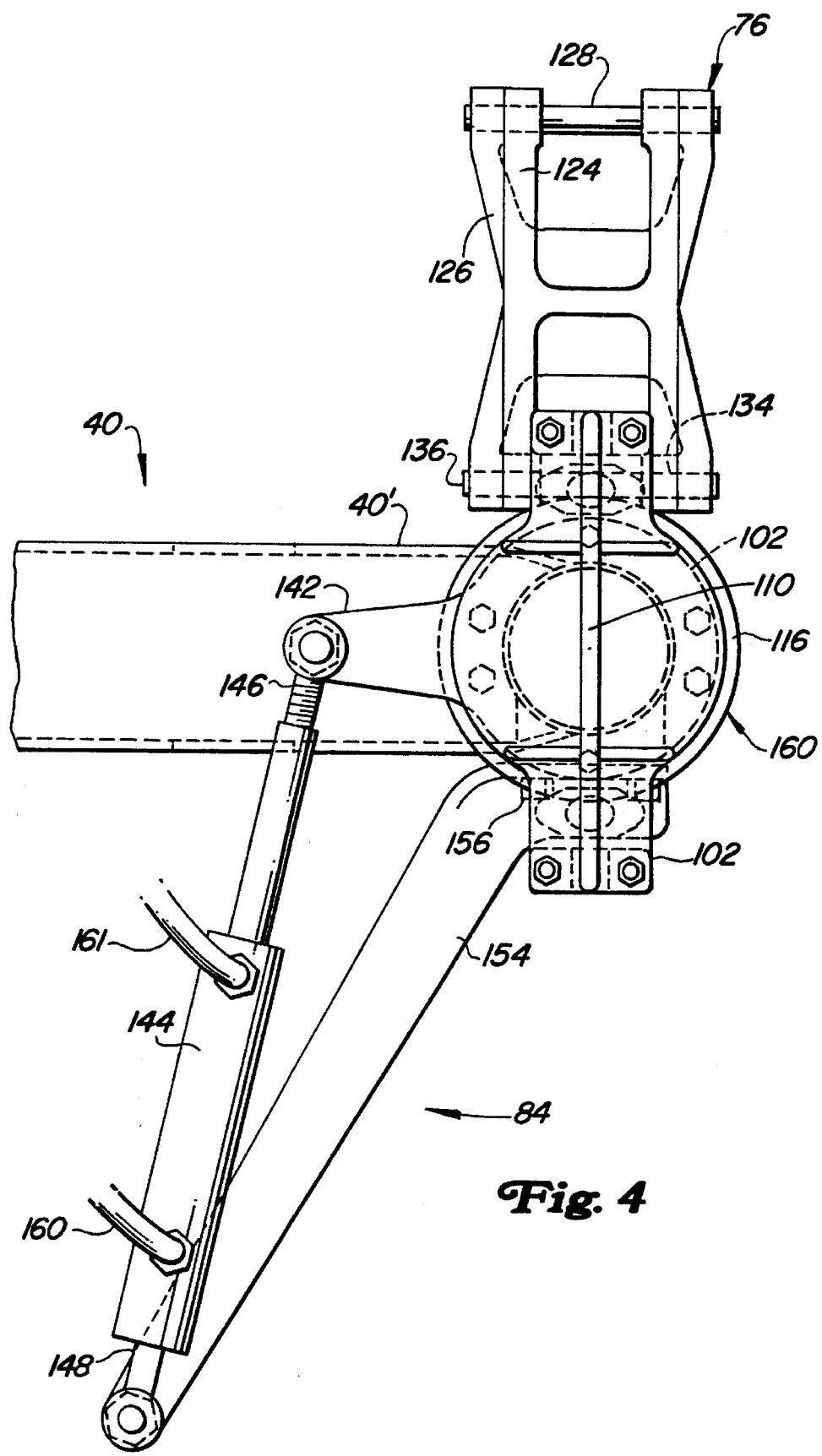
FIG. 4 is a top view of the strut assembly of FIG. 3.

The lower pivot bracket 102 includes a radially inwardly directed steering ear 142 connected to the steering assembly 84. The steering assembly 84 includes an adjustable length steering cylinder 144 having a rod end 146 pivotally connected to the steering ear 142 and a base end 148 pivotally connected at a fixed location relative to the strut journal 70. As shown in FIGS. 3 and 4, a steering bracket 154 has an aft end bolted at 156 to the journal 70 and an inner forward end pivotally connected to the base end 148 of the cylinder 144. The cylinder 144 is connected in series by a first line 160 to a mating cylinder 145 on the right hand steering assembly 82 (FIG. 2) so that as one of the cylinders retracts, the opposite cylinder will extend. A second line 161 is connected to a steering valve (not shown) located near the bottom of the cab 20 and operably connected to a steering wheel in the cab. As the steering wheel is moved to the right, the cylinder 144 is extended and the cylinder 145 is retracted to pivot the steering ears 142 and pivot brackets 102 in the clockwise direction as viewed in FIGS. 2 and 4. The scissors structures 76 cause the connecting structures 120 and the strut shafts 66 for the ground wheel assemblies 36 and 38 to rotate with the brackets 102 to steer the wheels 14. The steering ears 142 do not move up and down with the strut shafts 66 so that bump steer effects are eliminated. The scissors structures 76 also eliminate any torsional forces in the spring and mounting.

Rebound stops 166 depend from the bottom of the connecting structure 120 and contact mating pads on the lower pivot bracket 102 to limit downward movement of the strut shaft 66 within the strut journal 70. A jounce stop 168 supported on the top of the piston 118 limits upward movement of the strut shaft 66. The stops 166 and 168 are fabricated from a resilient material. A fill valve or air line 170 at the top of the air spring 116 is connected to a source of air pressure for controlling the pressure in the spring and for providing load and leveling control and a more even ride when the weight supported by the wheels 14 and 16 changes significantly. Preferably, the pressure in the air spring 116 is controlled so that the suspension is in a nominal or mid-stroke position under static conditions to minimize the number of times the suspension contacts the jounce and rebound stops 168 and 166. The valve or line 170 may be connected to an automatic pressure control system which monitors vehicle and operating conditions and provides optimum spring pressure for the conditions. The air springs 116 also facilitate lowering of the height of the frame 12 above the ground.

The rear non-steerable wheel assemblies 46 and 48 are substantially identical to the front wheel assemblies 36 and 38, with the exception of area of the lower pivotal connections of the scissors structure 78. The lower pivots 136 for non-steerable wheel assemblies 46 and 48 are connected to the axle adjacent the upper portion of the strut journals 72 at fixed, non-rotating locations 172 (FIG. 2) and maintain the wheels 16 in generally a straight-ahead steered position as the strut shafts 68 move up and down in the journals 72 (see also, for example, the alternate embodiment of FIG. 7). The similarities in the wheel assemblies 46 and 48 reduce the number of different parts necessary for fabricating the sprayer 10 and facilitate different steering arrangements. For example, it is possible to easily convert the sprayer 10 to a four-wheel steer vehicle by replacing the non-steerable wheel assemblies 46 and 48 with steerable wheel assemblies 36 and 38. Front and rear fender assemblies 176 and 178 are supported relative to the wheels 14 and 16.

Description of the Alternate Embodiment:

Referring now to FIGS. 5–7, an alternate embodiment of the invention will be described. The structure is similar in many respects to that described above for FIGS. 1–4, and reference numbers for corresponding components will be the same with the suffix "a" added. Reference may be had to the above description for FIGS. 1–4 for the description of the corresponding components and their operation.

A steerable wheel assembly 38a includes an ear 142a projecting to the left (outwardly) from the lower pivot bracket 102a. The right steerable wheel assembly (not shown) is similar in construction and has an ear also projecting to the left (inwardly). A steering assembly 84a includes a telescoping transverse shaft 182 rotatably supported near its ends by brackets 184 fixed to axle ends 40a'. As the wheel tread is adjusted, the brackets 184 move with the ends 40a' and the shaft 182 telescopes to accommodate different spacings between the wheels 14a. Each end of the shaft 182 is connected to an arm 186 having an upper end pivotally connected at 188 to the forward end of a tie rod 190. The aft end of the tie rod 190 is connected at 192 to the ear 142a. A steering cylinder 194 is connected between each of the axle ends 40a' and the arms 186. The steering cylinders 194 are connected in parallel to each other and to a conventional steering control (not shown) by hydraulic lines 200. As the cylinders 194 are extended, the arms 186 and tie rods 190 move forwardly to turn the wheels 14a to the right. Retracting the cylinders 194 turns the wheels 14a to the left.

The upper mount 110a and the connecting structure 120a include forwardly and rearwardly projecting pairs of ears 206 and 208, and shock absorbers 210 are connected between each of the pairs 206 and 208. The shock absorbers 210 extend substantially parallel to the straps 106a and help dampen strut shaft oscillations.

The rear wheel assembly 48a (FIG. 7) is similar in/construction to the front wheel assembly 38a. The scissors structure 78a is shown projecting in the forward direction rather than in the rearward direction, and the lower pivotal connections 136a are located at fixed, non-rotatable locations 172a to maintain the wheel 16a in the forward direction.

Steering, shock absorbing and cushioning components are located substantially entirely above the axle structures 40 and 42 for enhanced crop clearance, reduced crop and component damage, and easy access. The central location of the cab 20 (FIG. 1) in combination with the sloped hood 26 provides excellent forward visibility and allows the operator to view all four wheels 14 and 16 from the cab.

Having described the preferred embodiment, it will become apparent that various modifications can be made without departing from the scope of the invention as defined in the accompanying claims.

We claim:

1. In an agricultural sprayer having a frame adapted for forward movement over the ground where crops to be sprayed are located, a suspension system comprising:

an upright strut shaft having upper and lower ends and a central portion;

an axle having a strut journal mounting the central portion of the strut shaft for axial movement therein;

a ground-engaging wheel connected to the lower end of the strut shaft;

an upper mount extending above the axle; and a spring located above the axle and supported between the upper end of the strut shaft and the upper mount, the strut shaft moving axially in the journal and cushioning between the ground-engaging wheel and the frame as the strut shaft moves axially in the journal.

2. The invention as set forth in claim 1 wherein the strut journal rotatably mounts the strut shaft for rotation about an upright steering axis, and further including scissors structure having an upper link connected to the upper end of the strut shaft for rotation therewith and a lower link pivotally connected to the upper link and to a steering assembly for rotating the strut shaft while permitting axial movement of the strut shaft relative to the spring, the axial movement being substantially independent of the rotation of the strut shaft.

3. The invention as set forth in claim 2 wherein the steering assembly includes a steering arm connected to the lower link for rotating the lower and upper links, the scissors structure maintaining a preselected strut shaft rotational location as the strut shaft moves vertically relative to the strut journal.

4. The structure as set forth in claim 3 wherein the steering arm and scissors structure are located above the axle to provide clearance between the ground and the axle to accommodate passage of the crops to be sprayed below the axle, the steering arm remaining at a preselected vertical location relative to the axle as the strut shaft moves axially.

5. The invention as set forth in claim 1 including scissors structure located above the axle and having an upper link connected to the upper end of the strut shaft and a lower link connected to the strut journal for maintaining the strut shaft at a preselected angular position relative to the strut journal while permitting axial movement of the strut shaft relative to the journal.

6. The invention as set forth in claim 2 wherein the steering assembly comprises means for adjusting the axle relative to the frame to adjust vehicle wheel spacing while retaining steering function without steering assembly adjustment.

7. The invention as set forth in claim 6 wherein the steering assembly includes a steering cylinder connected between the strut shaft and the axle and movable with the axle as the wheel spacing is adjusted.

8. The invention as set forth in claim 2 further comprising a second wheel and wherein the steering assembly includes a telescoping steering shaft extending between the strut shaft and the second wheel for facilitating adjustment of distance between the ground engaging wheel and the second wheel.

9. The invention as set forth in claim 1 wherein the spring comprises a pneumatic spring compressed between the upper end of the strut shaft and the upper mount, and wherein the lower end of the strut shaft is devoid of any cushioning members, thereby substantially eliminating damaging contact between the crops being sprayed and cushioning members.

10. The invention as set forth in claim 9 further comprising a steering arm and means for connecting the steering arm to the strut shaft for rotation of the steering arm in unison with the strut shaft while maintaining the steering arm at a preselected vertical location relative to the axle as the strut shaft moves vertically to thereby avoid bump steering effects on rough ground.

11. The invention as set forth in claim 10 wherein the steering arm is located above the axle out of interfering relationship with the crop being sprayed.

12. The invention as set forth in claim 1 further comprising a lower mount, wherein the spring comprises a pneumatic spring supported between the upper and lower mounts, and a linkage connecting the upper and lower mounts to prevent torsional forces in the spring.

13. In an agricultural sprayer having a fore-and-aft extending main frame adapted for movement over ground where crops including tall standing crops are present, a suspension system comprising:
  a plurality of cushioned ground wheel assemblies, the ground wheel assemblies including an upright journal connected to the frame, a strut shaft slidably received by the upright journal for vertical movement therein, the strut shaft having an upper end projecting upwardly from the journal and a lower wheel supporting end, a ground wheel connected to the wheel supporting end, a cushioning member supported above the journal and providing a downward bias on the strut shaft, the cushioning member absorbing shock as the ground wheel moves over rough ground, and strut shaft rotational control structure connected between the journal and the upper end for maintaining ground wheel in a preselected steered orientation.

14. The invention as set forth in claim 13 wherein the rotational control structure includes an upright variable height member having one end connected at a preselected vertical position on the journal and an opposite end connected to the upper end of the strut shaft and movable vertically with the strut shaft as the cushioning member absorbs shock.

15. The invention as set forth in claim 14 wherein the one end is connected to a rotatable member for rotation at a generally fixed vertical location relative to the upright journal, the rotatable member having a rotational axis centered on the axis of the strut shaft, and wherein the rotatable member is connected to a steering control.

16. The invention as set forth in claim 14 wherein the one end is connected to the journal and maintains the strut shaft at a preselected angular position in the journal while permitting vertical movement of the strut shaft in the journal.

17. The invention as set forth in claim 15 wherein the steering control includes a steering cylinder connected to the rotatable member.

18. An agricultural sprayer having a fore-and-aft extending frame adapted for forward movement over the ground, a steerable four wheel suspension comprising:
  first axle structure connected to one end of the frame;
  a pair of steerable wheel assemblies supported by the first axle structure, the steerable wheel assemblies including an upright journal connected to the first axle structure, a strut shaft slidably and rotatably received within the journal and having an upper end projecting above the journal and a lower end supporting a steerable ground wheel, a gas-filled cushioning member and a steering member operably connected to the strut shaft and supported substantially above the axle structure;
  second axle structure offset in the fore-and-aft direction from the first axle structure; and
  a second pair of wheel assemblies connected to the second axle structure including independent strut suspension having lower ends connected to ground wheels, cushioning members located substantially entirely above the second axle structure.

19. The invention as set forth in claim 18 wherein the first and second pairs of wheel assemblies have substantially similar cushioning structures, each with a gas-filled cushioning member, and the second pair of wheel assemblies includes strut shafts.

20. The invention as set forth in claim 18 wherein the first and second pairs of wheel assemblies include scissors structure connected to the corresponding strut shafts for orienting the wheels in generally a preselected angular position, the scissors structure including horizontal pivot structure permitting upright movement of the strut shafts.

21. The invention as set forth in claim 20 wherein the scissors structure is located substantially entirely above the first and second axle structure.

22. The invention as set forth in claim 20 further comprising steering structure mounted for rotation about an upright axis relative to the first axle structure and connected to the scissors structure for rotating the scissors structure to turn the strut shafts and provide steering.

23. The invention as set forth in claim 18 further comprising upper and lower mounts supporting the cushioning members substantially entirely above the axle structure.

24. The invention as set forth in claim 18 including a cab supported midway in the fore-and-aft direction between the first and second axle structures and providing direct viewing of the first and second wheel assemblies from the cab, and a hood extending forwardly from the cab and sloping downwardly in the forward direction to a forwardmost position generally aligned with a forwardmost extremity of one pair of the wheel assemblies.

\* \* \* \* \*